United States Patent
Van Der Linde et al.

[15] 3,694,715
[45] Sept. 26, 1972

[54] CONTACTLESS DIRECT CURRENT MOTOR REVERSING CIRCUIT

[72] Inventors: John R. Van Der Linde, Salem; Lyle W. Fairey, Roanoke, both of Va.

[73] Assignee: General Electric Company

[22] Filed: Sept. 28, 1970

[21] Appl. No.: 75,853

[52] U.S. Cl. ................................318/139, 318/300
[51] Int. Cl. ..............................................H02r 5/16
[58] Field of Search......318/246, 251, 293, 294, 300, 318/256, 257, 139

[56] References Cited

UNITED STATES PATENTS

| | | | |
|---|---|---|---|
| 3,560,820 | 2/1971 | Unnewehr | 318/139 X |
| 3,413,520 | 11/1968 | Westbrook | 318/294 |
| 3,480,849 | 11/1969 | Thornsen et al. | 318/294 |

Primary Examiner—Bernard A. Gilhenay
Assistant Examiner—W. E. Duncanson, Jr.
Attorney—Arnold E. Renner, James C. Davis, Jr., Frank L. Neuhauser, Oscar B. Waddell and Joseph B. Forman

[57] ABSTRACT

A contactless, reversing circuit for a direct current motor, wherein the current from a variable frequency pulsed, direct current source is applied to the series field of the motor by a first pair of solid state switching devices for forward rotation of the motor, and by a second pair of solid state devices for reverse rotation of the motor. An additional single solid state switching device, common to both pairs of devices and normally carrying the induced armature current during a blocking period between pulses, is de-energized during the transfer of conduction between the one direction pair to the other direction pair of devices, in order to assure the blocking state of the one pair before the other pair is turned on.

5 Claims, 1 Drawing Figure

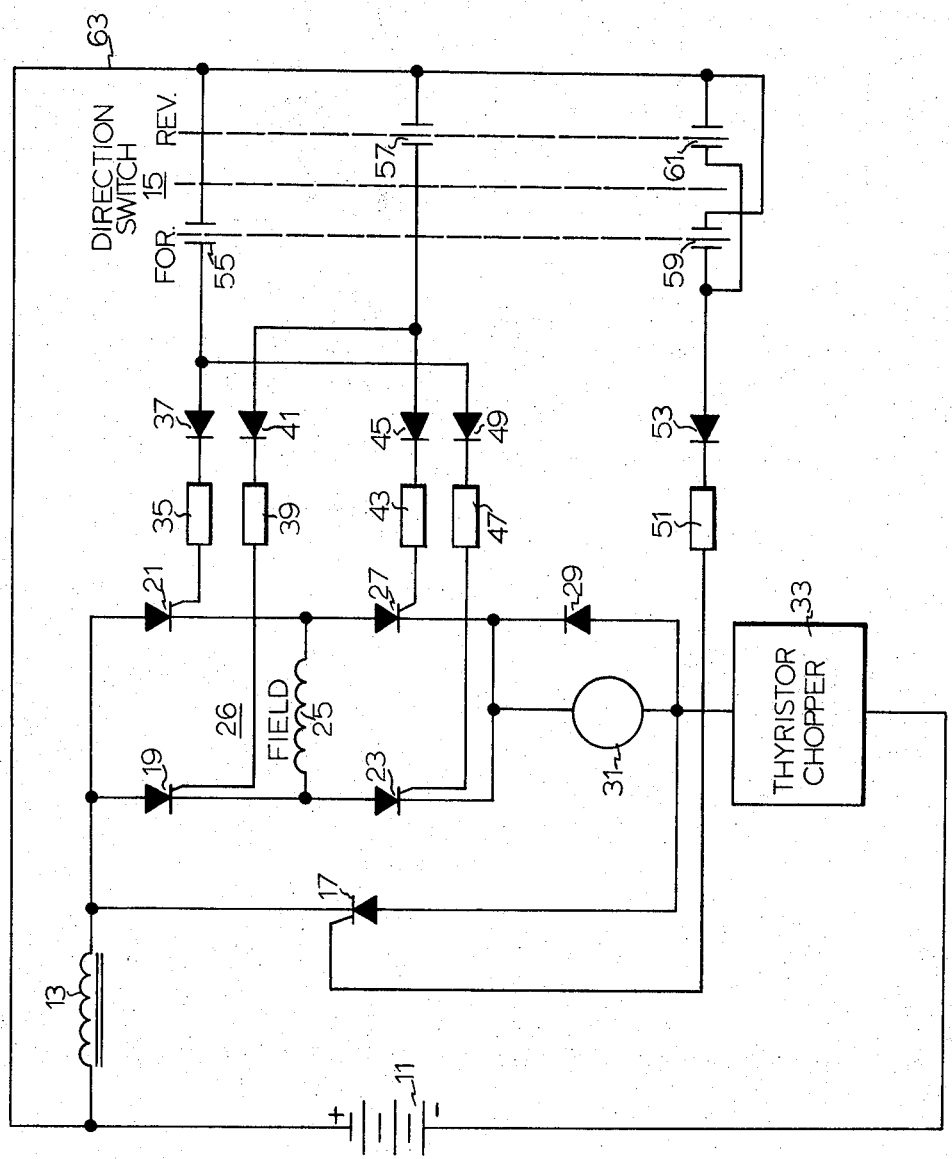
PATENTED SEP 26 1972
3,694,715
INVENTORS
JOHN R. VAN DER LINDE
LYLE W. FAIREY

CONTACTLESS DIRECT CURRENT MOTOR REVERSING CIRCUIT

BACKGROUND OF THE INVENTION

In electric vehicles, such as battery trucks and forklift trucks, a motor having a series field and operated from a battery source is repeatedly reversed in the direction of rotation. In the past this function has been performed by two or four direction contactors which are so connected to the series field of the motor that one set of contacts of the contactors will energize the field in one direction while the other set of contacts allows current to flow in the opposite direction through the series motor field.

In dust laden or corrosive atmospheres, contact life of these contactors becomes limited through chemical and abrasive action, resulting in faulty operation of the vehicle. In order to avoid this condition, maintenance at predetermined intervals is required. Contactors, as all other mechanical apparatus, are subject to wear, resulting in unreliable operation and eventual replacement of the entire contactor.

In an explosive atmosphere, there exists the possibility that arcing of the contacts may cause fire and explosion.

SUMMARY OF THE INVENTION

In order to overcome these problems, the present invention provides a static switching circuit whereby the above-noted direction contactors are replaced by two pairs of solid state switching devices, each pair connected to the motor field in a manner which directs the current therethrough in a direction opposite of the other pair. Also included is an additional solid state switching device which normally conducts the flyback or armature-induced current during the blocking period of the direction devices. This additional device is connected in series with both pairs of direction switching devices.

During change of direction of the motor, i.e., when conduction of the current is transferred from one pair of switching devices to the other, the single switching device is de-energized in order to allow the conducting pair of direction devices to turn off before the opposing pair of direction devices is turned on.

BRIEF DESCRIPTION OF THE DRAWING

The drawing illustrates a contactless reversing circuit in accordance with a preferred embodiment of the present invention.

DETAILED DESCRIPTION

In the ensuing description, the several solid state switching devices are termed "thyristors." It is to be understood that these devices, while termed thyristors, may be any semiconductors or combination of semiconductors which performs the switching functions of a thyristor.

The combination of a PNP and a NPN transistor interconnected to form a regenerative feedback pair is an example of a possible substitution in performance of the static latching switching functions of the thyristor.

Referring to the drawing, a positive terminal of storage battery 11 provides electrical current to one side of a transformer primary winding 13, the other side of which connects to the cathode of thyristor 17 and to the anodes of a pair of direction thyristors 19 and 21. For motor rotation in one direction, current will pass through thyristor 19, motor field 25, and through a thyristor 27 into motor armature 31; or when opposite rotation is required, current is conducted through thyristor 21, motor field 25, and a thyristor 23 to motor armature 31. A diode 29 is connected in parallel to armature 31 and opposes the normal flow of electrical current through the direction circuit 26, which is made up of thyristors 19, 21, 23, and 27 and further includes motor field 25. Diode 29 provides a conductive path for the induced armature current when the motor is reversed while rotating. The other side of armature 31 connects to the anode of thyristor 17, and a thyristor chopper circuit 33 (illustrated in block form) which provides a conductive path for the induced armature current when the motor is reversed while rotating. A connection from the thyristor chopper 33 to the negative terminal of the storage battery 11 completes the armature-series field loop of the circuit.

Storage battery 11 also provides current to a common connection 63 of a direction switch 15. A contact 55, when closed, allows current to be conducted from common connection 63 through a diode 37, a resistor 35 into the gate of direction thyristor 21, and through a diode 49 and a resistor 47 into the gate of direction thyristor 23.

Similarly, when contact 57 of switch 15 is closed, it allows current from common connection 63 to be conducted through a diode 45 and a resistor 43 into the ate of direction thyristor 27, as well as through a diode 41 and a resistor 39 into the gate of direction thyristor 19. Resistors 35, 39, 43, 47 and an additional resistor 51 are provided to limit the current level input to the gates of he thyristors. Diodes 37, 41, 45, 49 and a further diode 53 provide isolation whereby each of the thyristors is gated individually in order to avoid the simultaneous conduction of both the forward and reverse thyristors. The direction designations forward and reverse are arbitrarily assigned to contacts 55 and 57, respectively. Thus when contact 55 is closed, current is conducted through the series motor field 25 in a direction whereby the motor armature 31 is caused to rotate in the forward direction. Similarly, when contact 57 is closed, current is conducted through the series motor field 25 in a direction whereby the motor armature 31 is caused to rotate in the reverse direction.

Two additional contacts, 59 and 61, are connected in parallel and direct current through diode 53 and resistor 51 into the gate of thyristor 17 when direction switch 15 is in either the forward or reverse state. Both contacts 59 and 61 are, however, in nonconducting state during the transfer of the switch 15 from one direction state to the other.

In prior art, contactors are used in the place of thyristors 19, 21, 23, and 27, the contacts of which allow current conduction of the series motor field to be changed in direction in a similar manner as described above.

Reference is made to U.S. Pat. No. 3,344,328 titled "Direct Current Motor Plugging Circuit" by H. E. Morris for a complete description of motor reversing by means of contactor switching. The referenced patent also contains a full description of the operation of the chopper circuit 33. Very briefly, however, the chopper circuit converts the current from battery 11 to a pulsed square wave, the frequency of which is varied in order to produce a mean battery current which is proportional in value to the frequency of he pulses produced, thereby controlling the rotational speed of the armature 31.

In the prior art, a diode is provided which carries current induced in the motor armature during the "off period" of the thyristor chopper circuit; i.e., when no current is being conducted through the motor armature from an outside source (the increment of time between adjacent pulses). This induced armature current is termed "flyback current," resulting in the diode being termed the flyback diode. In the present invention, a thyristors 17 termed the "flyback thyristor," performs the function of circulating the flyback current in addition to other functions which will be described later.

The characteristics of a thyristor are such that a momentary positive pulse applied to the gate thereof will cause the thyristor to conduct; however, in order to be turned off, it is necessary in addition to removing the gate applied signal to either remove all power from the thyristor or to momentarily apply reverse voltage between the cathode and anode thereof. Thus, during the on period of the thyristor chopper circuit 33, the potential across the thyristor 17 is such that the greater positive value is applied to the cathode, causing this thyristor 17 to turn off. However, during the off period of the thyristor chopper circuit 33, the induced current from the armature will circulate through thyristor 17, providing a gate signal is present, and through one pair of thyristors of direction circuit 26.

As previously stated, thyristors 19 and 27 or 21 and 23 provide means for reversal of current flow through the motor field 25 depending on which of pairs of thyristors is energized. With the closing of contact 55 of directional switch 15, corresponding to the forward direction, current will pass from the common connection 63 through contact 55 through diodes 37 and 49 and resistors 35 and 47, respectively, to thyristors 21 and 23, thus placing these thyristors in a conductive state. Current will be conducted through thyristor 21, through field 25 in the direction from right to left and through thyristor 23 before flowing through armature 31. Conversely, contact 57 represents the reverse contact of direction switch 15 and when closed allows current to be conducted from the common connection 63 through diodes 41 and 45 and resistors 39 and 43 to thyristors 19 and 27, respectively, thereby placing these thyristors in a conductive state. Current passes through thyristor 19 and motor field 25 in the direction from left to right, and thyristor 27 to armature 31. With respect to armature 31, the direction of current is reversed through the field 25 from the previously described example. These currents are conducted only during the "on" time of the thyristor chopper circuit 33. An induced current flowing through thyristor 17 during the off period of the thyristor chopper circuit 33 tends to maintain the preselected thyristors 19 and 27 or 21 and 23 of the direction circuit 26 in a conductive state. This condition produces a problem when reversal of the motor is required.

With one pair of thyristors in conducting state, a possibility exists of a direct short-circuit when the opposing pair of thyristors is activated. It is, therefore, necessary that one pair of thyristors be nonconducting before the opposing pair is turned on. This condition is realized by momentarily removing all power from the direction circuit 26. Thyristor 17 performs the function of interrupting the circulating flyback current during the off period of the chopper circuit 33, thereby causing all power to be removed from the thyristors in the direction circuit 26, allowing the conducting pair of thyristors to turn off before the other pair of thyristors is turned on.

The gate signal is applied to thyristor 17 by closing either of the contacts 59 or 61 of direction switch 15 which is designed to provide contact opening of both these contacts during transfer from one contact to the other. For example, assume that the motor is rotating in the forward direction so that contacts 55 and 59 of the directional switch 15 are closed. A current is, therefore, applied through contact 59, diode 53 and resistor 51 to the gate of thyristor 17, thereby placing this thyristor in a conductive state. A current is also conducted through contact 55 and through associated diodes and resistors to the gates of thyristors 21 and 23. When reversal of the motor 31 is desired, the directional switch 15 is operated, opening contacts 55 and 59 and closing contacts 57 and 61. Thus, during the operation of directional switch 15 from the forward position to the reverse position, a period of time exists during which all the contacts of the direction switch 15 are open. This removes the gate signal from thyristors 17, 19, 21, 23, and 27. Thyristor 17 turns off and blocks the circulating current which exists during the off time of thyristor chopper circuit 33. Current is thereby prevented from passing through thyristors 21 and 23 at this time. This assures that these thyristors are also placed in a nonconducting state. When contacts 57 and 59 close in the reverse position of directional switch 15, power is supplied to the gates of thyristors 19 and 27, allowing these thyristors to conduct current from the battery 11 to the motor. Simultaneously, contact 61 is closed and allows current to be applied to the gate of thyristors 17; so that during the off period of chopper circuit 33 the induced current from the armature 31 circulates through thyristor 17 and the reverse thyristors 19 and 27. Conversely, when the directional switch 15 is rotated to the forward position, contacts 57 and 61 now open before contacts 55 and 59 close. the circulating current is blocked by nonconducting thyristor 17 which causes thyristors 27 and 19 to turn off. When the gate current is now conducted by contact 55, thyristors 21 and 23 are placed in a conductive state which allows current from the storage battery 11 to be applied to the motor. When contact 59 closes, the gate signal is applied to thyristor 17 which allows the induced current from the armature 31 to be applied to the forward thyristors 21 and 23 and through series field 25 to armature 31, thereby reversing the direction of the motor.

Thus, during a change of direction of the motor, a nonconducting state of one pair of direction thyristors is assured before the opposing direction pair of thyristors is placed in a conducting state.

While the invention has been explained and described with the aid of particular embodiments thereof, it will be understood that the invention is not limited thereby and that many modifications retaining and utilizing the spirit thereof, without departing essentially therefrom, will occur to those skilled in the art in applying the invention to specific operating environments and conditions. It is therefore contemplated by the appended claims to cover all such modifications as fall within the scope and spirit of the invention.

What is claimed is:

1. A contactless reversing circuit for controlling the direction of rotation of a direct current motor, which is supplied from a pulsed direct current source, said motor having a field winding comprising:
   a. first pair of solid state switching devices connected to the motor field winding for directing current through the motor field winding in one direction;
   b. a second pair of solid state switching devices connected to the motor field winding for directing current through the motor field winding in the opposite direction;
   c. first means for selectively providing gate signals to each pair of switching devices;
   d. a single solid state switching device connected in parallel with said motor and common to both pairs of switching devices for interrupting the current in the conducting pair of switching devices; and,
   e. second means for selectively providing a gate signal to said single solid state switching device, said first and said second means being operatively associated to ensure that absent a gate signal to one of said pairs of switching devices, no gate signal can be provided to said single switching device.

2. The invention in claim 1 wherein said solid state switching devices are thyristors.

3. The invention claimed in claim 2 wherein the single thyristor is de-energized during the transfer of current conduction from the first pair of thyristors to the second pair of thyristors.

4. The invention claimed in claim 2 further including means for energizing and de-energizing the gate of the single thyristor simultaneously with the energization and de-energization of the gates of each of the pairs of thyristors.

5. A contactless reversing circuit for controlling the direction of a direct current motor which is supplied from a direct current source, said motor having a field winding, comprising:
   a. a first pair of thyristors connected to the motor field winding for directing current through the motor field in one direction;
   b. a second pair of thyristors connected to the motor field winding for directing current through the motor field winding in the opposite direction;
   c. a thyristor chopper circuit connected in series with said motor and said direct current source for producing a pulsed variable frequency direct current;
   d. a single thyristor connected in parallel with said motor and common to said pairs of thyristors and connected to block current from the direct current source, said single thyristors normally conducting current generated by the motor during the interval between pulses; and
   e. switching means for selectively supplying gate signals to each of said respective pairs of thyristors and said single thyristor, said switching means serving to supply gate signals to said single thyristor only when gate signals are supplied to one of said pairs of thyristors.

* * * * *